(No Model.)
R. McC. BROWN.
HOE.
No. 396,856. Patented Jan. 29, 1889.
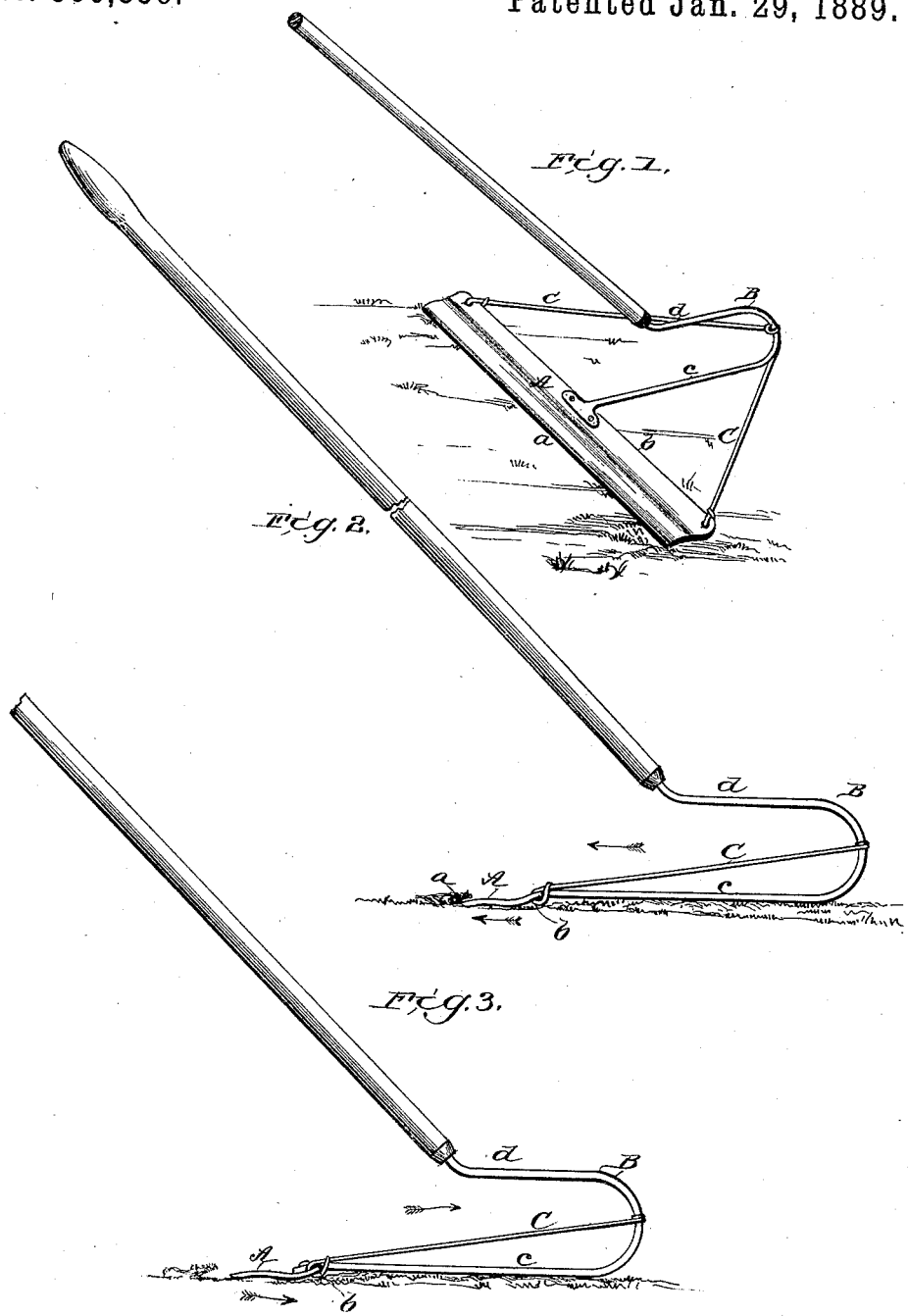
WITNESSES:
Fred G. Dieterich
Amos W. Hart
INVENTOR:
Robt. McC. Brown
BY Munn & Co
ATTORNEYS.

UNITED STATES PATENT OFFICE.

ROBERT McCULLOUGH BROWN, OF FORT GAINES, GEORGIA.

HOE.

SPECIFICATION forming part of Letters Patent No. 396,856, dated January 29, 1889.

Application filed September 24, 1888. Serial No. 286,155. (No model.)

*To all whom it may concern:*

Be it known that I, ROBERT MCCULLOUGH BROWN, of Fort Gaines, in the county of Clay and State of Georgia, have invented a new and useful Improvement in Hoes, of which the following is a specification.

My invention is an improvement in the class of hand-hoes used in cultivating gardens. The wide and oblong blade is curved slightly downward at its front or cutting edge, and upward at its rear edge, whereby it is adapted to take into the soil when the hoe is drawn forward and to ride over the same when the hoe is pushed backward. The shank is also made of unusual length, and its lower arm arranged in the same plane with the blade, so as to rest on the surface of the soil and serve as a gage for regulating the depth to which the blade may enter it, and also enable the latter to be drawn under long vines. Wires are extended diagonally from the outer extremity or bend of the shank to the corners of the blade to serve as guards or fenders, for preventing the blade becoming entangled in such vines when the hoe is pushed backward beneath them.

In the accompanying drawings, Figure 1 is a perspective view of the hoe. Fig. 2 is a side view showing the action of the blade in the soil when the hoe is drawn forward. Fig. 3 is a side view showing the action of the blade when the hoe is pushed backward.

The blade A of the hoe is oblong and rectangular; but if preferred its back may be slightly curved instead of straight, and its rear corners may be rounded instead of square. The cutting-edge $a$ is curved downward slightly to adapt it to take into the soil when the hoe is drawn forward, Fig. 2, and its rear edge $b$ is similarly curved upward to enable it to pass easily over the soil when the hoe is being pushed backward, Fig. 3. The shank B of the hoe is made of an iron or steel rod or bar bent into what may be termed a "U shape," one side or arm of the same being considerably longer than the other. The longer and lower arm, $c$, extends backward from the blade A in the same plane therewith, so as to rest flat on the surface of the soil, and the shorter and upper arm, $d$, is connected with the handle in the usual way. The handle is placed at an angle of about forty-five degrees to the blade and arm $c$ of the shank. A wire, C, extends from each rear corner of the blade to the bend of the shank and serves as a fender or guard, preventing the blade from catching and becoming tangled in long vines when the hoe is pushed backward.

In using the hoe the blade and lower arm, $c$, of the shank are placed flat on the ground, as shown in the drawings, and drawn forward, which causes the downwardly-curved edge $a$ to take into the soil to the depth of about an inch, Fig. 1, and in pushing the blade backward the curved rear edge $b$ rides up over the loosened soil, as shown in Fig. 3, while the guard-wires C keep the vines from catching on the blade and thus wholly obstructing its use.

It will be seen that in the forward movement of the blade the longer arm, $c$, of the shank serves as a gage, preventing the cutting-edge $a$ from taking too deep into the soil, and therefore constitutes virtually a narrow rear continuation of the blade. In other words, by means of the shank extended and arranged as described, I produce what is, in practical effect, a long-bladed hoe, but whose weight and cost are not proportionate. I propose to make the longer arm, $c$, of the shank about twenty-four inches long, and the blade one and one-fourth by eight inches; but these proportions may be varied somewhat. This length of the shank is the most important feature of the hoe, since it enables the blade to be drawn far under long vines of cultivated fruits or vegetables, so that the soil beneath them may be tilled without seriously disturbing the vines themselves.

What I claim is—

1. A hand-hoe consisting of a blade whose cutting-edge is curved downward, and a shank which extends rearward in the same plane with the blade, as shown and described, for the purpose specified.

2. A hand-hoe whose blade is curved upward at its rear edge, and whose shank extends from the blade in the same plane therewith, as shown and described.

3. A hand-hoe consisting of a blade whose cutting-edge is curved downward and its rear edge upward, and a shank which extends rearward from the blade and in the same plane with it, as shown and described.

4. A hand-hoe consisting of a blade whose cutting-edge is curved downward, a U-shaped shank whose lower arm extends rearward in the same plane with the blade, and a handle which is attached to the upper and shorter arm of said shank and is placed at an angle of about forty-five degrees to the said blade and lower arm of the shank, as shown and described.

5. The combination, with a hoe-blade and a shank extended rearward, of guard-wires which extend from the corners of the blade to the outer extremity of the shank, as shown and described, for the purpose specified.

September 4, 1888.

ROBERT McCULLOUGH BROWN.

Witnesses:
S. E. LEWIS,
JAS. C. SIMPSON.